US012690023B2

(12) United States Patent
Chen et al.

(10) Patent No.: US 12,690,023 B2
(45) Date of Patent: Jul. 21, 2026

(54) FREQUENCY-DOMAIN DATA MERGING METHOD AND APPARATUS, STORAGE MEDIUM, AND ELECTRONIC APPARATUS

(71) Applicant: ZTE Corporation, Shenzhen (CN)

(72) Inventors: Shijun Chen, Shenzhen (CN); Dawei Chen, Shenzhen (CN); Junqiang Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 253 days.

(21) Appl. No.: 18/724,016

(22) PCT Filed: Sep. 9, 2022

(86) PCT No.: PCT/CN2022/118246
§ 371 (c)(1),
(2) Date: Jun. 25, 2024

(87) PCT Pub. No.: WO2023/124232
PCT Pub. Date: Jul. 6, 2023

(65) Prior Publication Data
US 2025/0081172 A1 Mar. 6, 2025

(30) Foreign Application Priority Data
Dec. 31, 2021 (CN) .......................... 202111679953.1

(51) Int. Cl.
*H04W 72/0453* (2023.01)
*H04L 5/00* (2006.01)
*H04L 27/26* (2006.01)

(52) U.S. Cl.
CPC ....... *H04W 72/0453* (2013.01); *H04L 5/0005* (2013.01); *H04L 27/2628* (2013.01)

(58) Field of Classification Search
None
See application file for complete search history.

(56) References Cited

U.S. PATENT DOCUMENTS

2010/0261437 A1* 10/2010 Behzad .................. H04B 1/005
455/77
2013/0300938 A1* 11/2013 Leme ................. H04N 21/4382
348/607

(Continued)

FOREIGN PATENT DOCUMENTS

| CN | 101106689 A | 1/2008 |
| CN | 101741782 A | 6/2010 |

(Continued)

OTHER PUBLICATIONS

International Search Report for corresponding application PCT/CN2022/118246 filed Sep. 9, 2022; Mail date Dec. 1, 2022.

(Continued)

*Primary Examiner* — Jenkey Van
(74) *Attorney, Agent, or Firm* — CANTOR COLBURN LLP

(57) ABSTRACT

Provided are a frequency-domain data merging method and apparatus, a storage medium, and an electronic apparatus. The method includes: respectively performing up-conversion on baseband data of a plurality of frequency bands in a frequency domain, so as to obtain frequency-domain received data of each frequency band from among the plurality of frequency bands that has been subjected to up-conversion; and merging the frequency-domain received data of each frequency band that has been subjected to up-conversion, so as to obtain merged frequency-domain received data.

18 Claims, 6 Drawing Sheets

(56) References Cited

U.S. PATENT DOCUMENTS

| | | | | |
|---|---|---|---|---|
| 2014/0232468 A1* | 8/2014 | Hulbert | ................ | H04B 1/0475 330/293 |
| 2020/0067551 A1* | 2/2020 | Ghannouchi | ............ | H04B 1/28 |
| 2021/0091819 A1* | 3/2021 | Asuri | ..................... | H04B 1/406 |
| 2021/0119662 A1* | 4/2021 | Lee | ...................... | H04B 1/0053 |

FOREIGN PATENT DOCUMENTS

| | | | |
|---|---|---|---|
| CN | 106341141 A | 1/2017 | |
| CN | 112910533 A | 6/2021 | |
| WO | 2021075915 A1 | 4/2021 | |
| WO | 2021113814 A1 | 6/2021 | |

OTHER PUBLICATIONS

Chinese Office Action; Application No. 202111679953.1; Filing Date: Dec. 31, 2021; date of mailing: Sep. 29, 2025; 13 pages.

European Search Report for Application No. 22913501.7 dated Mar. 28, 2025, 9 pages.

Issler, Jean-Luc et al. "Toward centimetric positioning thanks to L-and S-Band GNSS and to meta-GNSS signals." 2010 5th ESA Workshop on Satellite Navigation Technologies and European Workshop on GNSS Signals and Signal Processing (NAVITEC). IEEE, (2010): 8 pages.

Ma, Hui et al. "Passive GNSS-based SAR resolution improvement using joint Galileo E5 signals." IEEE Geoscience and Remote Sensing Letters 12.8 (2015): 1640-1644.

Nardin, Andrea et al.. "Impact of non-idealities on GNSS meta-signals processing." 2020 European Navigation Conference (ENC). IEEE, (2020); 8 pages.

Paonni, Matteo, et al. "GNSS meta signals: Coherently composite processing of multiple GNSS signals." Proceedings of the 27th international technical meeting of the satellite division of the institute of navigation (ION GNSS + 2014); 10 pages.

Schwalm, Carolin et al. "Ziv-Zakai bound and multicorrelator compression for a Galileo E1 meta-signal." 2020 European Navigation Conference (ENC). IEEE, (2020): 9 pages.

* cited by examiner

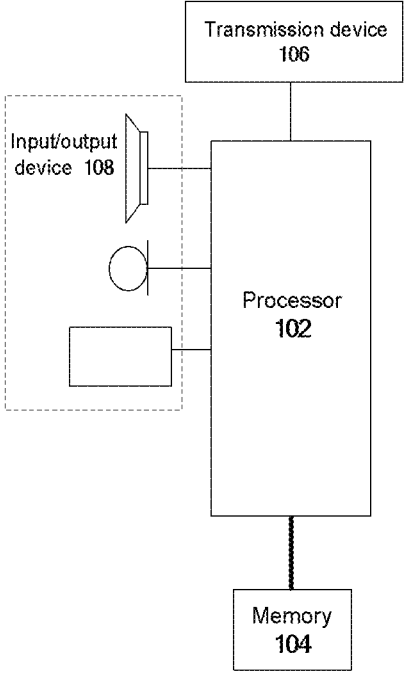

Transmission device
106

Input/output
device  108

Processor
102

Memory
104

F i g. 1

Up-conversion is respectively performed on baseband data of a plurality of frequency
bands in a frequency domain, so as to obtain frequency-domain received data of
each frequency band from among the plurality of frequency bands that has been
subjected to up-conversion                                                          S202

The frequency-domain received data of each frequency band that has been subjected    S204
to up-conversion is merged, so as to obtain merged frequency-domain received data F i g. 2

FREQUENCY-DOMAIN DATA MERGING METHOD AND APPARATUS, STORAGE MEDIUM, AND ELECTRONIC APPARATUS

CROSS-REFERENCE TO RELATED APPLICATION

The present disclosure is a national stage filing under 35 U.S.C. § 371 of international application number PCT/CN2022/118246, filed Sep. 9, 2022, which claims priority to Chinese Patent Application No. 202111679953.1, filed to the China National Intellectual Property Administration on Dec. 31, 2021, the disclosure of which is hereby incorporated by reference in its entirety.

TECHNICAL FIELD

The present disclosure relates to the field of communications, and in particular to a frequency-domain data merging method and apparatus, a storage medium, and an electronic apparatus.

BACKGROUND

With the continuous development of the times, mobile positioning technology is receiving more and more attention, and whether it is Global Positioning System (GPS) positioning technology or performs positioning by using a wireless sensor network or other positioning methods, there are limitations. For example, due to significant GPS signal attenuation of Beidou and GPS positioning in indoor dense urban areas, enough four stars cannot be searched and GPS positioning cannot be completed, so that a positioning function is constrained.

4G and 5G wireless systems are Orthogonal Frequency Division Multiplexing (OFDM) systems, which are communication systems based on Fast Fourier Transformation (FFT). Although the coverage environment of a cellular network is significantly better than a satellite signal, factors such as Non Line of Sight (NLOS) and multipath may also lead to the problem of inaccurate cellular positioning. Although there have been some research achievements in the industry, they are generally based on ideal assumptions and require further research into feasible technical solutions in practical applications.

High-accuracy positioning methods are classified into several positioning methods based on time, energy, and angle measurements. Due to the advantages of high stability, good consistency, etc., time-based wireless signal measurement has become the mainstream positioning technology, and Beidou GPS uses time-based positioning technology.

The positioning accuracy of the time-based positioning method is mainly related to a bandwidth, especially in a multipath environment, the bandwidth determines the extent to which the multipaths can be distinguished. The higher bandwidth can distinguish the multi-paths that are closer in time, while the lower bandwidth may cause adjacent wireless multipath signals to become inseparable paths, resulting in deterioration of the measurement accuracy and poor positioning effect. However, in practical wireless operations, a spectrum is a scarce resource, and it is difficult to allocate a large block of spectrum resources to an operator. Usually, the operator has several discrete frequency bands available. Therefore, how to utilize multi-band resources to improve the positioning accuracy becomes a problem to be solved during high-accuracy positioning. The principle of carrier aggregation processing in a traditional wireless system is to respectively process a plurality of frequency bands, that is, to respectively convert the plurality of frequency bands to a baseband and then decode, which actually treats the plurality of frequency bands as a plurality of channels. Although this method meets the communication requirement and can increase the throughput with the aggregation of the plurality of frequency bands, the positioning accuracy cannot be improved.

Therefore, in view of the problem in the related art of how to utilize multi-band resources to improve the positioning accuracy, no effective solution has been proposed yet.

SUMMARY

Embodiments of the present disclosure provide a frequency-domain data merging method and apparatus, a storage medium, and an electronic apparatus, so as to at least solve the problem in the related art of how to utilize multi-band resources to improve the positioning accuracy.

According to an aspect of the embodiments of the present disclosure, a frequency-domain data merging method is provided, which includes: respectively performing up-conversion on baseband data of a plurality of frequency bands in a frequency domain, so as to obtain frequency-domain received data of each frequency band from among the plurality of frequency bands that has been subjected to up-conversion; and merging the frequency-domain received data of each frequency band that has been subjected to up-conversion, so as to obtain merged frequency-domain received data.

According to another aspect of the embodiments of the present disclosure, a frequency-domain data merging apparatus is further provided, which includes: an obtaining module, configured to respectively perform up-conversion on baseband data of a plurality of frequency bands in a frequency domain, so as to obtain frequency-domain received data of each frequency band from among the plurality of frequency bands that has been subjected to up-conversion; and a merging module, configured to merge the frequency-domain received data of each frequency band that has been subjected to up-conversion, so as to obtain merged frequency-domain received data.

According to another aspect of the embodiments of the present disclosure, a computer-readable storage medium is further provided, in which a computer program is stored. When running, the computer program is configured to perform the frequency-domain data merging method.

According to another aspect of the embodiments of the present disclosure, an electronic apparatus is further provided, which includes: a memory, a processor, and a computer program stored in the memory and runnable on the processor. The processor performs the frequency-domain data merging method through the computer program.

According to the present disclosure, by means of respectively performing up-conversion on the baseband data of the plurality of frequency bands in the frequency domain, so as to obtain the frequency-domain received data of each frequency band from among the plurality of frequency bands that has been subjected to up-conversion, and merging the frequency-domain received data of each frequency band that has been subjected to up-conversion, so as to obtain the merged frequency-domain received data, the technical problem of how to utilize the multi-band resources to improve the positioning accuracy is solved, thereby improving the positioning accuracy.

BRIEF DESCRIPTION OF THE DRAWINGS

The drawings described herein are used to provide a further understanding of the present disclosure, and constitute a part of the present disclosure, and the exemplary embodiments of the present disclosure and the description thereof are used to explain the present disclosure, but do not constitute improper limitations to the present disclosure. In the drawings:

FIG. 1 is a structural block diagram of hardware of a computer terminal of a frequency-domain data merging method according to an embodiment of the present disclosure.

FIG. 2 is a flowchart of a frequency-domain data merging method according to an embodiment of the present disclosure.

DETAILED DESCRIPTION OF THE EMBODIMENTS

Figure 3:
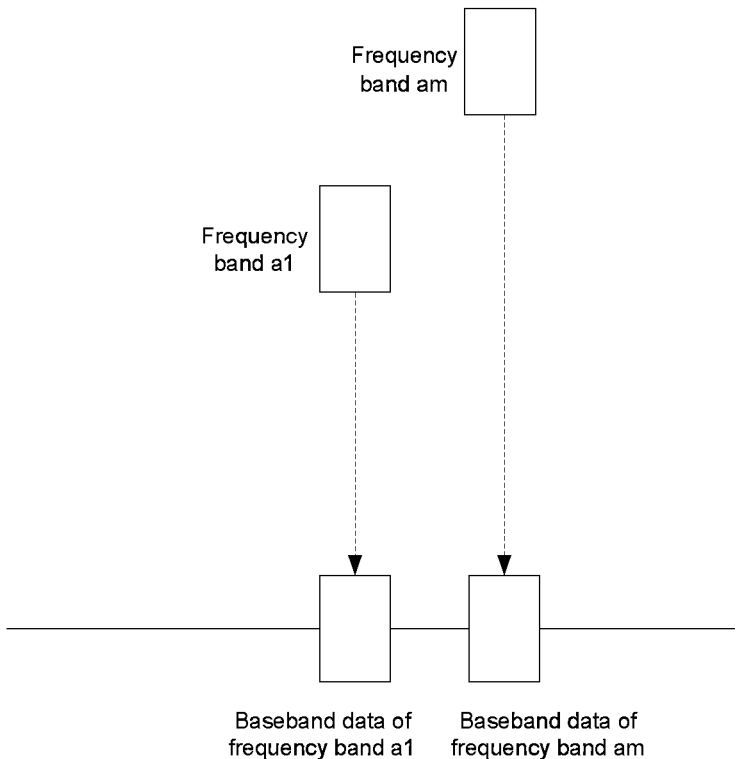
FIG. 3 is a schematic diagram of a principle of down-converting a frequency band to a baseband according to an embodiment of the present disclosure.

In order to make the solutions of the present disclosure understood by those skilled in the art, the technical solutions in the embodiments of the present disclosure will be clearly and completely described below in combination with the drawings in the embodiments of the present disclosure. It is apparent that the described embodiments are not all embodiments but only part of embodiments of the present disclosure. All other embodiments obtained by those of ordinary skill in the art on the basis of the embodiments in the present disclosure without creative work shall fall within the scope of protection of the present disclosure.

It is to be noted that terms "first", "second" and the like in the description, claims and the above drawings of the present disclosure are used for distinguishing similar objects rather than describing a specific sequence or a precedence order. It should be understood that the data used in such a way may be exchanged where appropriate, in order that the embodiments of the present disclosure described here may be implemented in an order other than those illustrated or described herein. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

The method embodiment provided by the embodiments of the present disclosure may be implemented in a computer terminal a computer terminal or a similar computing apparatus. Taking running on the computer terminal as an example, FIG. 1 is a structural block diagram of hardware of a computer terminal of a frequency-domain data merging method according to an embodiment of the present disclosure. As shown in FIG. 1, the computer terminal may include one or more (only one is shown in FIG. 1) processors 102 (the processors 102 may include, but are not limited to, a Micro Processor Unit (MPU) or a Programmable Logic Device (PLD), and a memory 104 configured to store data. In an exemplary embodiment, the computer terminal may further include a transmission device 106 with a communication function and an input and output device 108. Those of ordinary skill in the art may understand that the structure shown in FIG. 1 is only schematic and not intended to limit the structure of the computer terminal. For example, the computer terminal may further include more or fewer components than those shown in FIG. 1, or has a different configuration with equivalent or more functions than those shown in FIG. 1.

The memory 104 may be configured to store a computer program, for example, a software program and a module of application software, for example, a computer program corresponding to the frequency-domain data merging method in the embodiments of the present disclosure. The processor 102 runs the computer program stored in the memory 104, thereby executing various functional applications and data processing, namely implementing the method. The memory 104 may include a high speed Random Access Memory (RAM) and may further include a non-volatile memory such as one or more magnetic storage apparatuses, a flash memory, or other non-volatile solid state memories. In some examples, the memory 104 may further include memories remotely set relative to the processor 102, which may be connected to the computer terminal through the network. Examples of the network include, but are not limited to, the Internet, the Intranet, a local area network, a mobile communication network, and a combination thereof.

The transmission device 106 is configured to receive or send data through a network. A specific example of the network may include a wireless network provided by a communication provider of the computer terminal. In an example, the transmission device 106 includes a Network Interface Controller (NIC), which may be connected with other network devices through a base station, thereby communicating with the Internet. In an example, the transmission device 106 may be a Radio Frequency (RF) module, which is configured to communicate with the Internet in a wireless manner.

FIG. 2 is a flowchart of a frequency-domain data merging method according to an embodiment of the present disclosure. As shown in FIG. 2, the frequency-domain data merging method includes the following steps.

At S202, up-conversion is respectively performed on baseband data of a plurality of frequency bands in a frequency domain, so as to obtain frequency-domain received data of each frequency band from among the plurality of frequency bands that has been subjected to up-conversion.

At S204, the frequency-domain received data of each frequency band that has been subjected to up-conversion is merged, so as to obtain merged frequency-domain received data.

According to the above embodiment, by means of respectively performing up-conversion on the baseband data of the plurality of frequency bands in the frequency domain, so as to obtain the frequency-domain received data of each frequency band from among the plurality of frequency bands that has been subjected to up-conversion, and merging the frequency-domain received data of each frequency band that has been subjected to up-conversion, so as to obtain the merged frequency-domain received data, the problem of how to utilize multi-band resources to improve the positioning accuracy is solved, thereby improving the positioning accuracy.

In the embodiments of the present disclosure, up-conversion is respectively performed on the baseband data of the plurality of frequency bands in the frequency domain, so as to obtain the frequency-domain received data of each frequency band from among the plurality of frequency bands that has been subjected to up-conversion, and the frequency-domain received data of each frequency band that has been subjected to up-conversion is merged, so as to obtain the merged frequency-domain received data.

Optionally, in an exemplary embodiment, in order to better understand how to respectively perform up-conversion on the baseband data of the plurality of frequency bands in the frequency domain in S202, a technical solution is provided, which includes the specific steps of: respectively determining a frequency difference between a center frequency of each frequency band from among the plurality of frequency bands and an overall center frequency, where the overall center frequency is a frequency determined according to a center frequency of a first frequency band, a center frequency of a second frequency band, a bandwidth of the first frequency band, and a bandwidth of the second frequency band, the first frequency band is a frequency band with the maximum center frequency from among the plurality of frequency bands, and the second frequency band is a frequency band with the minimum center frequency from among the plurality of frequency bands; and performing up-conversion on baseband data of each frequency band in the frequency domain according to the frequency difference between the center frequency of each frequency band and the overall center frequency, so as to obtain the frequency-domain received data of each frequency band from among the frequency bands that has been subjected to up-conversion, where a subcarrier frequency of the frequency-domain received data of each frequency band from among the plurality of frequency bands is configured to indicate the sum of a subcarrier frequency of the baseband data of each frequency band from among the plurality of frequency bands and the frequency difference.

Optionally, in an exemplary embodiment, before respectively performing up-conversion on the baseband data of the plurality of frequency bands in the frequency domain, a technical solution is further provided, which includes the specific steps of: acquiring pre-configured frequency band information; and down-converting the frequency band data of each frequency band from among the plurality of frequency bands to a baseband according to the frequency band information, so as to obtain baseband data of each frequency band from among the plurality of frequency bands.

Optionally, in an exemplary embodiment, the frequency band information includes: a frequency band center frequency, a frequency band bandwidth, and time-frequency resource information for transmitting a positioning signal.

Optionally, in an exemplary embodiment, in order to better understand how to merge the frequency-domain received data of each frequency band that has been subjected to up-conversion, so as to obtain the merged frequency-domain received data in S204, the frequency-domain received data of each frequency band that has been subjected to up-conversion is sorted according to a numbering order of subcarriers of each frequency band, and the sorted frequency-domain received data of each frequency band that has been subjected to up-conversion is merged into the merged frequency-domain received data. In a process of merging the sorted frequency-domain received data of each frequency band that has been subjected to up-conversion into the merged frequency-domain received data, zero padding is performed on the frequency-domain data missing the numbering order of the subcarriers in the merged frequency-domain received data.

Optionally, in an exemplary embodiment, a technical solution is further provided, which includes the specific step of: merging time-domain received data of each frequency band that has been subjected to up-conversion, so as to determine merged time-domain received data, including: obtaining the merged time-domain received data by performing inverse Fourier transform on the merged frequency-domain received data.

Optionally, in an exemplary embodiment, a technical solution is further provided, which may obtain merged frequency-domain channel data by dividing data of each frequency band in the merged frequency-domain received data by corresponding frequency band data in locally transmitted frequency-domain data. The locally transmitted frequency-domain data is configured to indicate locally merged original bandwidth frequency-domain transmission data, and is obtained in the following manner: sorting the transmitted data of each frequency band according to a size order of the subcarriers, and performing zero padding on the missing frequency band to merge the sorted data of each frequency band, so as to obtain the locally transmitted frequency-domain data. The merged frequency-domain channel data is configured to indicate merged bandwidth frequency-domain channel impulse response data, and is obtained in the following manner: obtaining the merged frequency-domain channel data by dividing frequency band data of each frequency band in the received merged frequency-domain received data by corresponding frequency data of each frequency band in the locally transmitted frequency-domain data; and measuring a signal Time of arrival (TOA) corresponding to the merged frequency-domain channel data by using a multiple signal classification method.

It is to be noted that the multiple signal classification method may include a multiple signal classification algorithm, which can be configured to estimate a channel delay.

Optionally, in an exemplary embodiment, a technical solution of measuring the signal TOA according to the merged time-domain received data is provided, which includes the specific step of: performing a mathematical correlation operation on the merged time-domain received data and the locally transmitted time-domain data, and using a detected earliest arrival signal corresponding to the merged time-domain received data as the signal TOA. The locally transmitted time-domain data is obtained by performing inverse Fourier transform on the locally transmitted frequency-domain data to a time domain.

It is to be noted that the mathematical correlation operation may include, but is not limited to, dividing the merged time-domain received data by the locally transmitted time-domain data.

Optionally, in an exemplary embodiment, a technical solution of measuring the signal TOA according to the merged time-domain received data is provided, which includes the specific step of: detecting merged time-domain channel data, and using a detected earliest arrival signal as the signal TOA. The merged time-domain channel data is configured to indicate merged bandwidth time-domain channel impulse response data, and is obtained in the following manner: obtaining the merged time-domain channel data by performing inverse Fourier transform on the merged frequency-domain channel data.

Next, the frequency-domain data merging method is further described in combination with the following embodiments.

Embodiment 1

This embodiment provides a frequency-domain data merging method, which includes the following specific steps.

At S1, frequency band information is configured.

Specifically, a receiver is configured with the frequency band information through a network. The frequency band information includes a frequency band center frequency, a frequency band bandwidth, and time-frequency resource information for transmitting a positioning signal.

It is to be noted that the time-frequency resource information includes, but is not limited to, a frame number, a subframe number, a time slot number, a symbol number, etc.

An RF link of the receiver is used to down-convert data of each frequency band to a baseband according to the frequency band information, so as to obtain baseband data of each frequency band. As shown in FIG. 3, a frequency band a1 is down-converted to zero frequency to obtain baseband data of the frequency band a1. A frequency band am is down-converted to zero frequency to obtain baseband data of the frequency band am.

Further, in one embodiment, a process of down-converting the frequency band to the baseband may be described in combination with the following formulas, and the frequency band a1 is expressed as:

$$x_t^{a1} = \sum_i \rho_i e^{j\varpi_{a1}(t-\tau_i)} \sum_{k=-K_{a1}}^{K_{a1}} X_{a1,k} e^{j\varpi_k(t-\tau_i)} \tag{1}$$

The baseband data of the frequency band a1 obtained by down-conversion is:

$$y_t^{a1} = \sum_i \rho_i e^{j\varpi_{a1}(-\tau_i)} \sum_{k=-K_{a1}}^{K_{a1}} X_{a1,k} e^{j\varpi_k(t-\tau_i)} \tag{2}$$

The frequency band am is expressed as:

$$x_t^{am} = \sum_i \rho_i e^{j\varpi_{am}(t-\tau_i)} \sum_{k=-K_{am}}^{K_{am}} X_{am,k} e^{j\varpi_k(t-\tau_i)} \tag{3}$$

The baseband data of the frequency band am obtained by down-conversion is:

$$y_t^{am} = \sum_i \rho_i e^{j\varpi_{am}(-\tau_i)} \sum_{k=-K_{am}}^{K_{am}} X_{am,k} e^{j\varpi_k(t-\tau_i)} \tag{4}$$

Where i is a multipath number, K is a number of subcarriers, a1 is a frequency band 1, am is a frequency band m, x is time-domain baseband data, $X_{am,k}$ is transmitted frequency-domain data, and ρ is a fading value. A center frequency of a1<a center frequency of a2< . . . <a center frequency of am.

Figure 4:
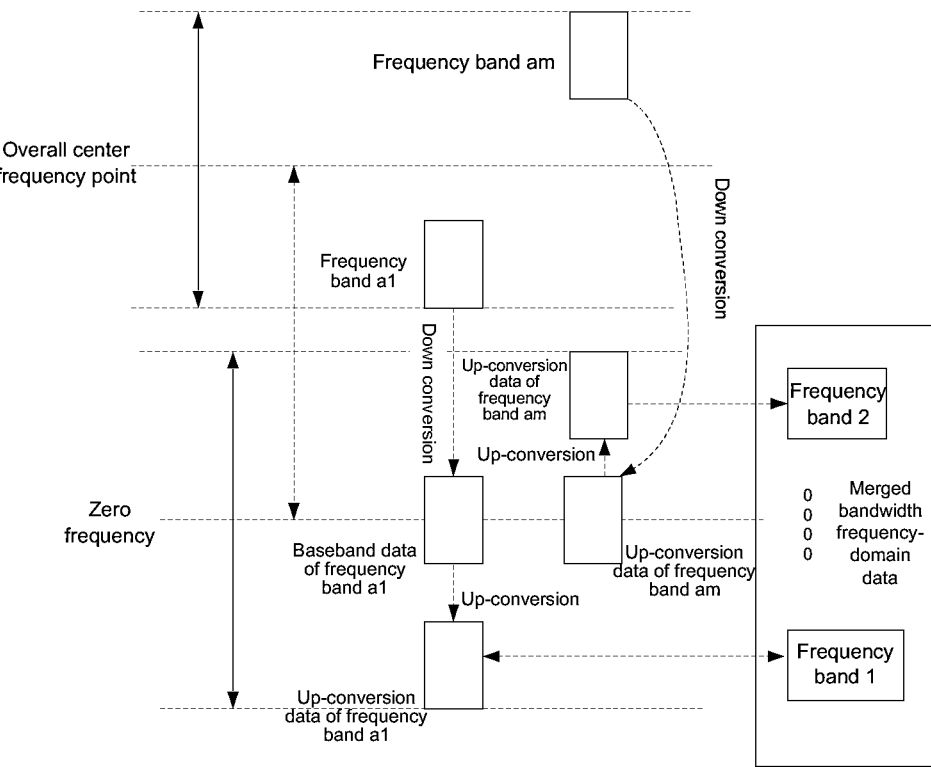
FIG. 4 is a schematic diagram of a merging principle of merged frequency-domain received data according to an embodiment of the present disclosure.

At S2, up-conversion is performed on the baseband data of a1, a2, . . . , am in a frequency domain according to a difference between each center frequency and an overall center frequency, as shown in FIG. 4.

The frequency band a1 is down-converted to zero frequency to obtain the baseband data of the frequency band a1, up-conversion is performed on the baseband data of the frequency band a1, and the obtained frequency conversion data of the frequency band a1 is used as the frequency band 1. Similarly, the frequency band am is down-converted to zero frequency to obtain the baseband data of the frequency band am, up-conversion is performed on the baseband data of the frequency band am, the obtained frequency conversion data of the frequency band am is used as the frequency band 2, zero padding is performed on the missing frequency band data between the frequency band 1 and the frequency band 2, and the frequency band data after zero padding, the frequency band 1, and the frequency band 2 are merged into bandwidth frequency-domain data (equivalent to the merged frequency-domain received data).

The overall center frequency in FIG. 4 may be obtained in the following manner.

The overall center frequency=0.5×(the center frequency of the frequency band m+the center frequency of the frequency band 1+0.5×the bandwidth of the frequency band m−0.5×the bandwidth of the frequency band 1).

The full-band bandwidth in FIG. 4 may be obtained in the following manner.

The full-band bandwidth=the center frequency of the frequency band m−the center frequency of the frequency band 1+0.5×the bandwidth of the frequency band m+0.5×the bandwidth of the frequency band 1.

The frequency band m corresponds to the above am.

Up-conversion is performed on the baseband data to obtain the baseband data that has been subjected to up-conversion.

$$y_t^{am} = \sum_i \rho_i e^{j\varpi_{am}(-\tau_i)} \sum_{k=-K_{am}}^{K_{am}} X_{am,k} e^{j\varpi_k(t-\tau_i)} \tag{6}$$

$$y_t^{am} e^{j(\Delta_m)(t)} = \left[ \sum_i \rho_i e^{j\varpi_{am}(-\tau_i)} \sum_{k=-K_{am}}^{K_{am}} X_{am,k} e^{j\varpi_k(t-\tau_i)} \right] e^{j(\Delta_m)(t)}$$

$$= \sum_i \rho_i e^{j(\varpi_{a0}+\Delta_m)(-\tau_i)} \sum_{k=-K_{am}}^{K_{am}} X_{am,k} e^{j\varpi_k(t-\tau_i)} e^{j(\Delta_m)(t)}$$

$$= \sum_i \rho_i e^{j\varpi_{a0}(-\tau_i)} \sum_{k=-K_{am}}^{K_{am}} X_{am,k} e^{j(\varpi_k+\Delta_m)(t-\tau_i)} e^{j(\Delta_m)(t)}$$

Where $X_{R,am,k}$ is received frequency-domain data of the frequency band m that has been subjected to up-conversion, which is expressed as $$X_{R,am,k} = \sum_i \rho_i e^{j\varpi_{a0}(-\tau_i)} X_{am,k}.$$

$\overline{\omega}_{a0}$ is an equivalent frequency conversion amount after a received signal is subjected to down-conversion and then up-conversion. According to the above formulas, a subcarrier frequency of $X_{am,k}$ is changed from $\overline{\omega}_k$ into $\overline{\omega}_k + \Delta m$, and $\Delta m$ is a frequency difference between the center frequency of the frequency band m and the overall center frequency.

At S3, the received frequency-domain data of the baseband data of each frequency band that has been subjected to up-conversion is merged, so as to obtain merged bandwidth frequency-domain received data (equivalent to the merged frequency-domain received data) and merged bandwidth time-domain received data (equivalent to the merged time-domain received data), and a signal TOA is measured in a time domain or a frequency domain.

It is to be noted that a process of acquiring the merged bandwidth frequency-domain received data is that: the received frequency-domain data of each frequency band that has been subjected to up-conversion obtained in the previous step is sorted according to the size order of the subcarriers, and zero padding is performed on the frequency-domain data missing a numbering order of the subcarriers to obtain the merged bandwidth frequency-domain received data.

A process of acquiring the merged bandwidth time-domain received data is that: inverse Fourier transform is performed on the merged frequency-domain received data X to obtain the merged bandwidth time-domain received data.

At S4, a signal TOA is measured according to the obtained merged bandwidth frequency-domain received data or the merged bandwidth time-domain data.

A time domain measurement method 1 includes: performing a mathematical correlation operation on the merged bandwidth time-domain received data and locally merged original bandwidth time-domain transmission data (equivalent to the above locally transmitted frequency-domain data), and using a detected earliest arrival signal of the merged bandwidth time-domain received data as the signal TOA.

A process of acquiring the locally merged original bandwidth frequency-domain transmission data is that: each piece of frequency band data sent by a transmitter is sorted according to a size order of the numbers of the subcarriers, and zero padding is performed on the frequency-domain data missing the numbering order of the subcarriers, so as to obtain the locally merged original bandwidth frequency-domain transmission data (equivalent to the locally transmitted frequency-domain data).

A process of acquiring the locally merged original time-domain data is that: inverse Fourier transform is performed on the locally merged original transmitted frequency-domain data, so as to obtain locally merged original transmitted time-domain data.

Frequency-domain measurement is that: the merged bandwidth frequency-domain channel impulse response data uses a MUSIC method (equivalent to the above multiple signal classification method) to measure an earliest signal TOA.

A process of acquiring the merged bandwidth frequency-domain channel impulse response data (equivalent to the above merged frequency-domain channel data) is that: the merged bandwidth frequency-domain channel impulse response data is obtained by dividing each piece of frequency band data in the received merged bandwidth frequency-domain received data by corresponding frequency band data in the locally merged original bandwidth frequency-domain transmission data.

A process of acquiring the merged bandwidth time-domain channel impulse response data (equivalent to the above merged time-domain channel data) is that: inverse Fourier transform is performed on the merged bandwidth frequency-domain channel impulse response data to obtain merged bandwidth time-domain channel impulse response data.

A time-domain measurement method 2 includes: using an earliest arrival signal of the detected merged bandwidth time-domain channel impulse response data as the signal TOA.

Compared with the related art, the embodiment can adapt to the characteristics of discontinuous and non-uniform frequency-domain resource allocation of an OFDM system, and can make full use of aggregation to form a bandwidth signal TOA or angle measurement, thereby greatly improving the positioning accuracy.

Embodiment 2

A frequency band a1 and a frequency band a2 are respectively acquired, where the frequency band a1=2.6 GHz, the frequency band a2=3.5 GHz, and a signal bandwidth BW1 of the frequency band a1 and a signal bandwidth BW2 of the frequency band a2 are both 100 MHz.

A process of measuring a signal TOA of merged frequency-domain channel data in combination with a processing process of a transmitting end and a receiving end on frequency band data is described as follows.
1. Transmitting End A baseband signal is constructed: a signal bandwidth BW of a baseband signal is set to 100 MHz, an interval of subcarriers is 15 kHz, the baseband signal is respectively modulated onto the frequency band a1 and the frequency band a2, and a channel is set to a single path.
2. Receiving End (1) The frequency band data of a1 is down-converted from 2.6 GHz to zero frequency (i.e. 0 GHz), and the frequency band data of a2 is down-converted from 3.5 GHz to zero frequency through an RF link of a receiver, so as to obtain baseband data of a1 and baseband data of a2.

(2) A carrier frequency difference is 3.5 GHz-2.6 GHz=900 MHz, and the baseband data of a1 is up-converted to 450 MHz (900/2), and the baseband data of a2 is down-converted to −450 MHz in a frequency domain.

(3) The frequency-domain received data of each frequency band that has been subjected to up-conversion is merged, and zero padding is performed on the missing frequency-domain data to obtain merged bandwidth frequency-domain received data (equivalent to the above merged frequency-domain received data) and merged bandwidth time-domain received data corresponding to the merged bandwidth frequency-domain received data. A data length $L=(900 \times e^6)/(15 \times e^3) + 4096 \times 2 = 68192$, and the unit of a delay may be $1/(68192 \times 15 \times e^3)$s according to the data length.

(4) Measurement is performed in a time domain or the frequency domain.

Figure 5:
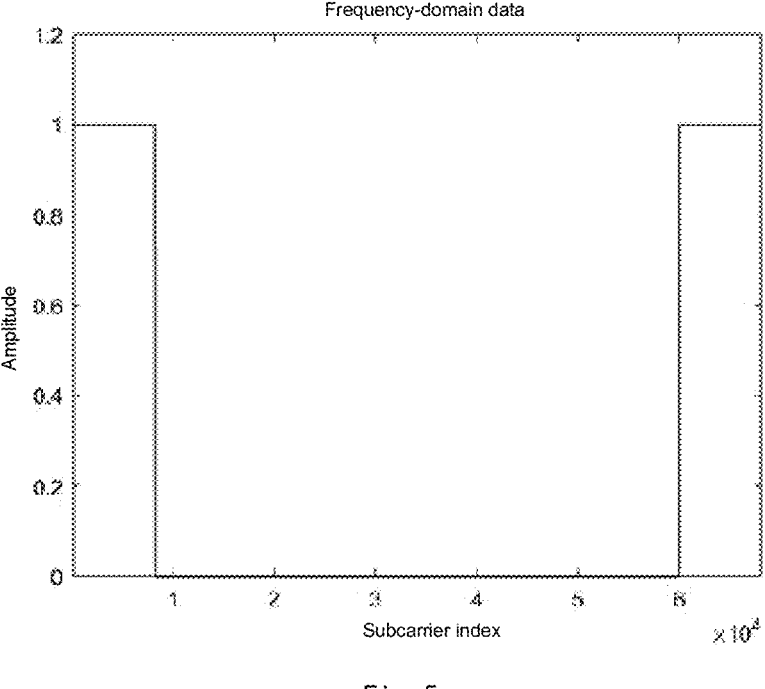
FIG. 5 is a first schematic diagram of a merging result of merged frequency-domain received data according to an embodiment of the present disclosure.
Figure 6:
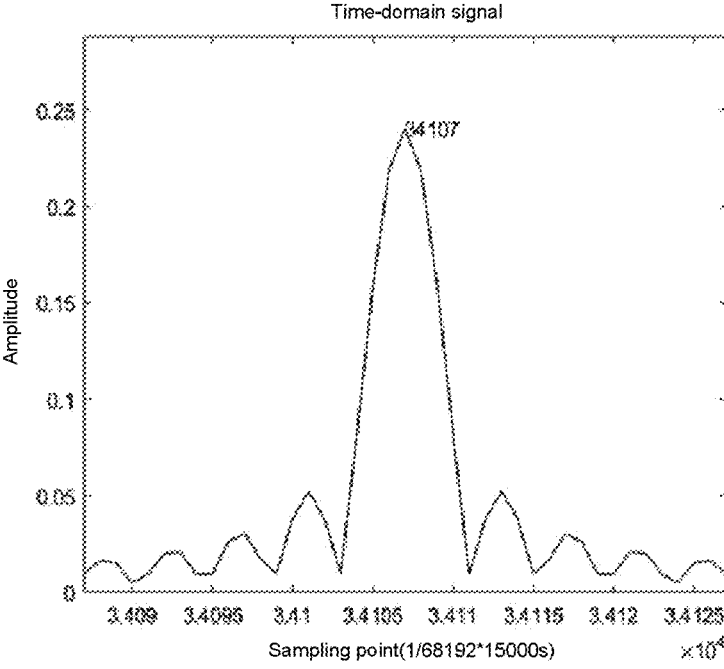
FIG. 6 is a first schematic diagram of a time-domain signal according to an embodiment of the present disclosure.

When the channel delay $tao = 10 \times 1/(68192 \times 15 e^3)$s, the received processed frequency-domain data is as shown in FIG. 5, where a subcarrier index represents an index number corresponding to a number of the subcarrier. At this time, a TOA is as shown in FIG. 6, and a TOA index number is 34107.

Figure 7:
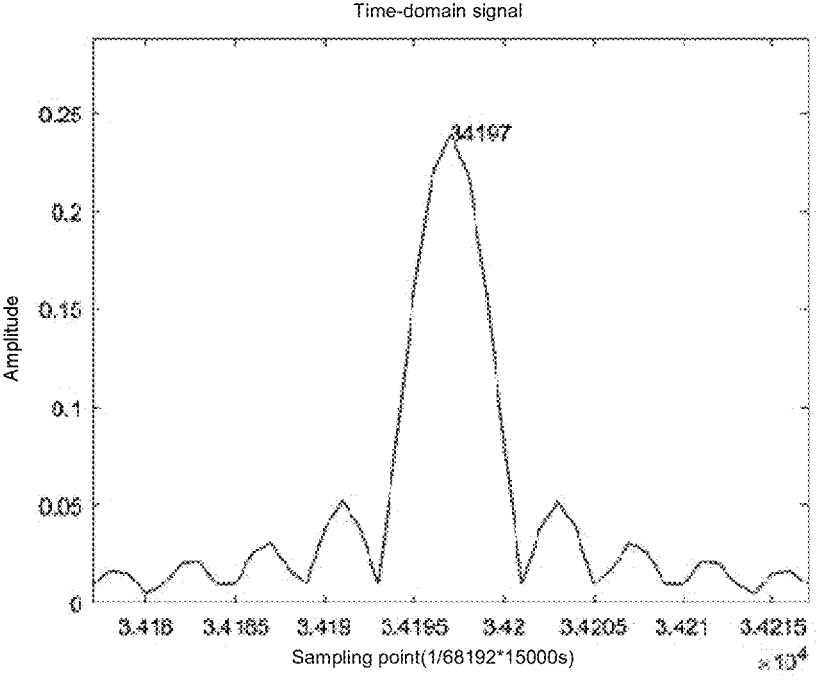
FIG. 7 is a second schematic diagram of a time-domain signal according to an embodiment of the present disclosure.

When the channel delay $tao = 100 \times 1/(68192 \times 15 e^3)$s, the received processed frequency-domain data is as shown in FIG. 5, and a TOA index number is as shown in FIG. 7 and is 34197.

Data analysis is performed: in a case where the channel delay tao changes from 10 to 100, the TOA changes 34197−

34107=90 (=100-10). It can be seen that the signal detection accuracy reaches $1/(68192\times15e^3)s$=0.98 ns. When a 5G signal has a bandwidth of 100 M, a corresponding signal detection physical resolution, that is, the signal detection accuracy is $1/122.88e^6$ (a baseband sampling rate corresponding to the bandwidth of 100 M in a 5G standard)=8.13 ns, which indicates that the solution effectively improves the signal detection accuracy.

A manner of acquiring the signal detection accuracy may be: $1/(68192\times15e^3)\times$(a change value of the channel delay tao/a change value of the TOA).

Embodiment 3

A frequency band a1 and a frequency band a2 are respectively acquired, where the frequency band a1=1.7 GHz, the frequency band a2=2.6 GHz, and a signal bandwidth BW1 of the frequency band a1 and a signal bandwidth BW2 of the frequency band a2 are both 20 MHz.

Figure 8:
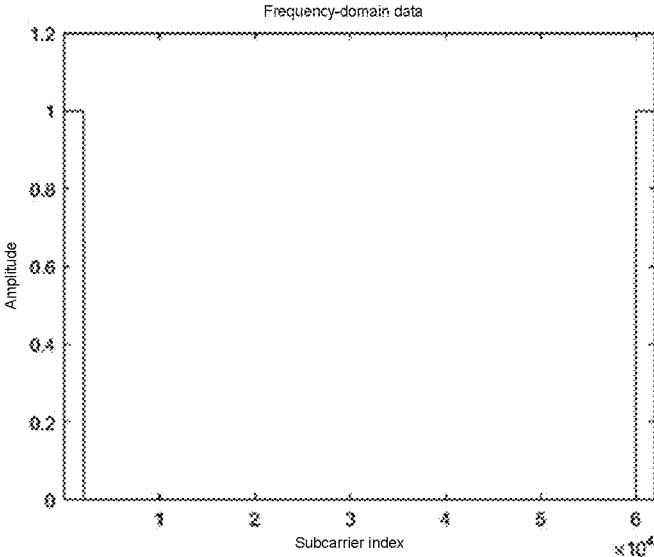
FIG. 8 is a second schematic diagram of a merging result of merged frequency-domain received data according to an embodiment of the present disclosure.
Figure 9:
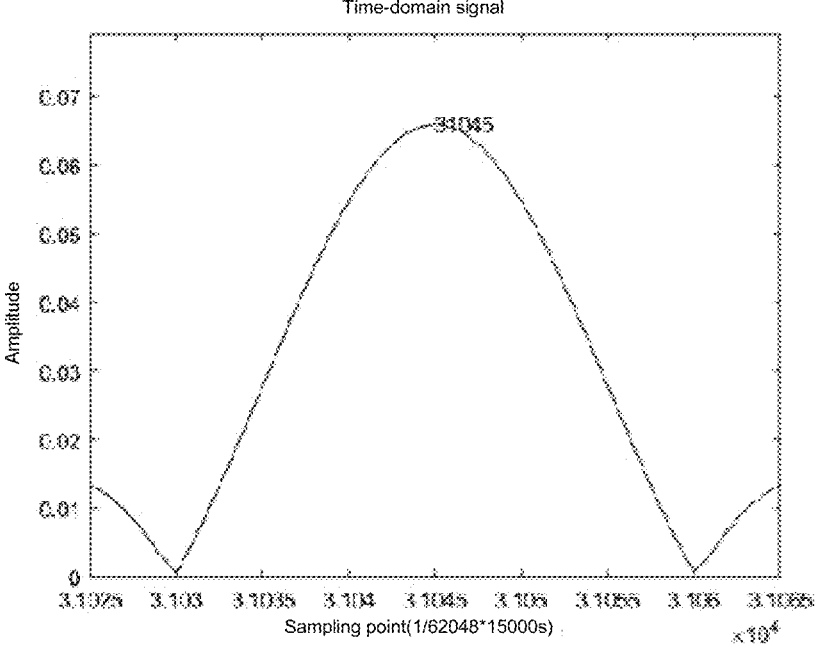
FIG. 9 is a third schematic diagram of a time-domain signal according to an embodiment of the present disclosure.
Figure 10:
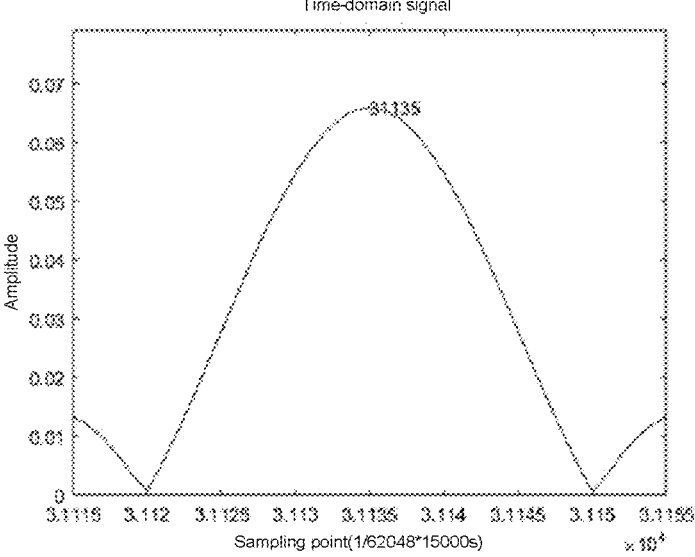
FIG. 10 is a fourth schematic diagram of a time-domain signal according to an embodiment of the present disclosure.

A process of measuring a signal TOA of merged frequency-domain channel data in combination with a processing process of a transmitting end and a receiving end on frequency band data is described as follows.
1. Transmitting End
A baseband signal is constructed: a signal bandwidth BW of a baseband signal is set to 20 MHz, an interval of subcarriers is 15 kHz, the baseband signal is respectively modulated onto the frequency band a1 and the frequency band a2, and a channel is set to a single path.
2. Receiving End
(1) The frequency band data of a1 is down-converted from 1.7 GHz to zero frequency, and the frequency band data of a2 is down-converted from 2.6 GHz to zero frequency through an RF link of a receiver, so as to obtain baseband data of a1 and baseband data of a2.
(2) A carrier frequency difference is 2.6 GHz-1.7 GHz=900 MHz, and the baseband data of a1 is up-converted to 450 MHz (900/2), and the baseband data of a2 is down-converted to -450 MHz in a frequency domain.
(3) The frequency-domain received data of each frequency band that has been subjected to up-conversion is merged, and zero padding is performed on the missing frequency-domain data to obtain merged bandwidth frequency-domain received data and merged bandwidth time-domain received data corresponding to the merged bandwidth frequency-domain received data. A data length $L=900e^6/15e^3+1024\times2$=62048, and the unit of a delay may be $1/(62048\times15\times e^3)s$ according to the data length.
(4) Measurement is performed in a time domain or the frequency domain.
When the channel delay tao=$20\times1/(62048\times15e^3)s$, the received processed frequency-domain data is as shown in FIG. 8. A subcarrier index represents an index number corresponding to a number of the subcarrier. At this time, a TOA is as shown in FIG. 9, and a TOA index number is 31045.
When the channel delay tao=$110\times1/(62048\times15e^3)s$, the received processed frequency-domain data is as shown in FIG. 8, and a TOA index number is as shown in FIG. 9 and is 31135.
Data analysis is performed: in a case where the channel delay tao changes from 20 to 110, the TOA changes 31135-31045=90 (=110-20). It can be seen that the signal detection accuracy reaches $1/(62048\times15e^3)s$=1.07 ns. When a Long Term Evolution (LTE) signal is on a 20M bandwidth, a corresponding signal detection physical resolution, that is, the signal detection accuracy is $1/30.72e^6$=32.55 ns, which indicates that the solution effectively improves the signal detection accuracy.

The signal detection accuracy may be acquired in the following manner: the signal detection accuracy=$1/(62048\times15e^3)\times$(a change value of the channel delay tao/a change value of the TOA).

According to the above embodiment, the frequency-domain data merging method is achieved through a multi-band aggregation bandwidth, and the bandwidth is used to improve the physical resolution under multipaths of a wireless signal, thereby improving the positioning accuracy.

Through the above description of implementations, those skilled in the art may clearly know that the method according to the above embodiments may be implemented by means of software plus a necessary common hardware platform, certainly by means of hardware; but in many cases, the former is the better implementation. Based on such understanding, the technical solution of the present disclosure substantially or the part making a contribution to the conventional art can be embodied in the form of a software product. The computer software product is stored in a storage medium (such as a Read-Only Memory (ROM)/ RAM, a magnetic disk, and a compact disc), including a number of instructions for causing a terminal device (which may be a mobile phone, a computer, a server, or a network device, etc.) to perform the methods described in various embodiments of the present disclosure.

The embodiments further provide frequency-domain data merging apparatus, which is configured to implement the above embodiments and preferred implementations. The embodiments and preferred implementations that have been elaborated will not be repeated here. The term "module" used below can realize a combination of software and/or hardware with an intended function. Although the device described in the following embodiment is preferably realized by software, but by hardware or a combination of software and hardware is also possible and conceived.

Figure 11:
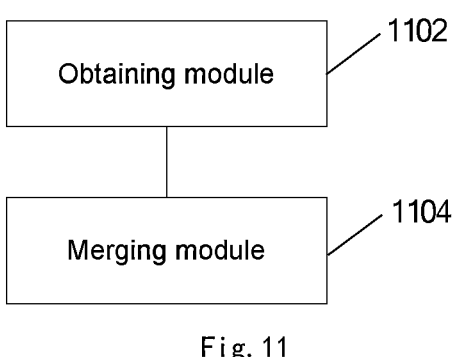
FIG. 11 is a structural block diagram of a frequency-domain data merging apparatus according to an embodiment of the present disclosure.

FIG. 11 is a structural block diagram of a frequency-domain data merging apparatus according to an embodiment of the present disclosure. As shown in FIG. 5, a frequency-domain data merging apparatus includes an obtaining module 1102 and a merging module 1104.

The obtaining module 1102 is configured to respectively perform up-conversion on baseband data of a plurality of frequency bands in a frequency domain, so as to obtain frequency-domain received data of each frequency band from among the plurality of frequency bands that has been subjected to up-conversion.

The merging module 1104 is configured to merge the frequency-domain received data of each frequency band that has been subjected to up-conversion, so as to obtain merged frequency-domain received data.

According to the above apparatus, by means of respectively performing up-conversion on the baseband data of the plurality of frequency bands in the frequency domain, so as to obtain the frequency-domain received data of each frequency band from among the plurality of frequency bands that has been subjected to up-conversion, and merging the frequency-domain received data of each frequency band that has been subjected to up-conversion, so as to obtain the merged frequency-domain received data, the problem of how to utilize multi-band resources to improve the positioning accuracy is solved, thereby improving the positioning accuracy.

In an exemplary embodiment, the obtaining module is further configured to respectively determine a frequency difference between a center frequency of each frequency band from among the plurality of frequency bands and an overall center frequency, where the overall center frequency is a frequency determined according to a center frequency of a first frequency band, a center frequency of a second frequency band, a bandwidth of the first frequency band, and a bandwidth of the second frequency band, the first frequency band is a frequency band with the maximum center frequency from among the plurality of frequency bands, and the second frequency band is a frequency band with the minimum center frequency from among the plurality of frequency bands; and perform up-conversion on baseband data of each frequency band in the frequency domain according to the frequency difference between the center frequency of each frequency band and the overall center frequency, so as to obtain the frequency-domain received data of each frequency band from among the frequency bands that has been subjected to up-conversion, where a subcarrier frequency of the frequency-domain received data of each frequency band from among the plurality of frequency bands is configured to indicate the sum of a subcarrier frequency of the baseband data of each frequency band from among the plurality of frequency bands and the frequency difference.

In an exemplary embodiment, the frequency-domain merging apparatus further includes a down-conversion module, configured to acquire pre-configured frequency band information; and down-convert the frequency band data of each frequency band from among the plurality of frequency bands to a baseband according to the frequency band information, so as to obtain baseband data of each frequency band from among the plurality of frequency bands.

In an exemplary embodiment, the frequency band information includes: a frequency band center frequency, a frequency band bandwidth, and time-frequency resource information for transmitting a positioning signal.

In an exemplary embodiment, the merging module is further configured to sort the frequency-domain received data of each frequency band that has been subjected to up-conversion according to a numbering order of subcarriers of each frequency band, and merge the sorted frequency-domain received data of each frequency band that has been subjected to up-conversion into the merged frequency-domain received data. In a process of merging the sorted frequency-domain received data of each frequency band that has been subjected to up-conversion into the merged frequency-domain received data, zero padding is performed on the frequency-domain data missing the numbering order of the subcarriers in the merged frequency-domain received data.

In an exemplary embodiment, the frequency-domain merging apparatus further includes a merged time-domain received data obtaining module, configured to merge time-domain received data of each frequency band that has been subjected to up-conversion, so as to determine merged time-domain received data, including: obtaining the merged time-domain received data by performing inverse Fourier transform on the merged frequency-domain received data.

In an exemplary embodiment, the frequency-domain merging apparatus further includes a time measurement module, configured to obtain merged frequency-domain channel data by dividing data of each frequency band in the merged frequency-domain received data by corresponding frequency band data in locally transmitted frequency-domain data. The locally transmitted frequency-domain data is configured to indicate locally merged original bandwidth frequency-domain transmission data, and is obtained in the following manner: sorting the transmitted data of each frequency band according to a size order of the subcarriers, and performing zero padding on the missing frequency band to merge the sorted data of each frequency band, so as to obtain the locally transmitted frequency-domain data. The merged frequency-domain channel data is configured to indicate merged bandwidth frequency-domain channel impulse response data, and is obtained in the following manner: obtaining the merged frequency-domain channel data by dividing frequency band data of each frequency band in the received merged frequency-domain received data by corresponding frequency data of each frequency band in the locally transmitted frequency-domain data; and measuring a signal TOA corresponding to the merged frequency-domain channel data by using a multiple signal classification method.

In an exemplary embodiment, the frequency-domain merging apparatus further includes a first measurement module, configured to perform a mathematical correlation operation on the merged time-domain received data and the locally transmitted time-domain data, and use a detected earliest arrival signal corresponding to the merged time-domain received data as the signal TOA. The locally transmitted time-domain data is obtained by performing inverse Fourier transform on the locally transmitted frequency-domain data to a time domain.

It is to be noted that the mathematical correlation operation may include, but is not limited to, dividing the merged time-domain received data by the locally transmitted time-domain data.

In an exemplary embodiment, the frequency-domain merging apparatus further includes a second measurement module, configured to detect merged time-domain channel data, and use a detected earliest arrival signal as the signal TOA. The merged time-domain channel data is configured to indicate merged bandwidth time-domain channel impulse response data, and is obtained in the following manner: obtaining the merged time-domain channel data by performing inverse Fourier transform on the merged frequency-domain channel data.

In an exemplary embodiment, the computer-readable storage medium may include, but is not limited to, a USB flash disk, an ROM, an RAM, a mobile hard disk, a magnetic disk, a compact disc, and other media capable of storing the computer program.

The specific examples in this embodiment may refer to the above embodiments and the examples described in the optional implementations, which will not be elaborated herein.

The embodiments of the present disclosure further provide an electronic apparatus, which includes a memory and a processor. A computer program is stored in the memory. The processor is configured to run the computer program to execute the steps in any of the above method embodiments.

Optionally, in this embodiment, the processor may be configured to execute the following steps through the computer program.

At S1, up-conversion is respectively performed on baseband data of a plurality of frequency bands in a frequency domain, so as to obtain frequency-domain received data of each frequency band from among the plurality of frequency bands that has been subjected to up-conversion.

At S2, the frequency-domain received data of each frequency band that has been subjected to up-conversion is merged, so as to obtain merged frequency-domain received data.

In an exemplary embodiment, the electronic apparatus may further include a transmission device and an input and output device. The transmission device is connected with the processor, and the input and output device is connected with the processor.

The specific examples in this embodiment may refer to the above embodiments and the examples described in the optional implementations, which will not be elaborated herein.

It is apparent that those skilled in the art should appreciate that the above modules and steps of the present disclosure may be implemented by a general-purpose computing device, and they may be centralized in a single computing device or distributed on a network composed of multiple computing devices; they may be implemented by a program code which is capable of being executed by the computing device, so that they may be stored in a storage device and executed by the computing device; and in some situations, the presented or described steps may be executed in an order different from that described here; or they are made into integrated circuit modules, respectively; or multiple modules and steps of them are made into a single integrated circuit module to realize. Therefore, the present disclosure is not limited to any particular combination of hardware and software.

The above are only the preferred embodiments of the present disclosure and are not intended to limit the present disclosure. For those skilled in the art, the present disclosure may have various modifications and variations. Any modifications, equivalent replacements, improvements and the like made within the principle of the present disclosure shall fall within the scope of protection of the present disclosure.

What is claimed is:

1. A frequency-domain data merging method, comprising:
respectively performing up-conversion on baseband data of a plurality of frequency bands in a frequency domain, so as to obtain frequency-domain received data of each frequency band from among the plurality of frequency bands that has been subjected to up-conversion; and
merging the frequency-domain received data of each frequency band that has been subjected to up-conversion, so as to obtain merged frequency-domain received data,
wherein the respectively performing up-conversion on baseband data of a plurality of frequency bands in a frequency domain comprises:
respectively determining a frequency difference between a center frequency of each frequency band from among the plurality of frequency bands and an overall center frequency, wherein the overall center frequency is a frequency determined according to a center frequency of a first frequency band, a center frequency of a second frequency band, a bandwidth of the first frequency band, and a bandwidth of the second frequency band, the first frequency band is a frequency band with the maximum center frequency from among the plurality of frequency bands, and the second frequency band is a frequency band with the minimum center frequency from among the plurality of frequency bands; and
performing up-conversion on baseband data of each frequency band in the frequency domain according to the frequency difference between the center frequency of each frequency band and the overall center frequency, so as to obtain the frequency-domain received data of each frequency band from among the frequency bands that has been subjected to up-conversion, wherein a subcarrier frequency of the frequency-domain received data of each frequency band from among the plurality of frequency bands is configured to indicate the sum of a subcarrier frequency of the baseband data of each frequency band from among the plurality of frequency bands and the frequency difference.

2. The frequency-domain data merging method according to claim 1, before respectively performing up-conversion on the baseband data of the plurality of frequency bands in the frequency domain, further comprising:
acquiring pre-configured frequency band information; and
performing down-conversion on the frequency band data of each frequency band from among the plurality of frequency bands to a baseband according to the frequency band information, so as to obtain baseband data of each frequency band from among the plurality of frequency bands.

3. The frequency-domain data merging method according to claim 2, wherein the frequency band information comprises: a frequency band center frequency, a frequency band bandwidth, and time-frequency resource information for transmitting a positioning signal.

4. The frequency-domain data merging method according to claim 1, wherein the merging the frequency-domain received data of each frequency band that has been subjected to up-conversion, so as to obtain merged frequency-domain received data comprises:
sorting the frequency-domain received data of each frequency band that has been subjected to up-conversion according to a numbering order of subcarriers of each frequency band, and merging the sorted frequency-domain received data of each frequency band that has been subjected to up-conversion into the merged frequency-domain received data;
wherein in a process of merging the sorted frequency-domain received data of each frequency band that has been subjected to up-conversion into the merged frequency-domain received data, zero padding is performed on the frequency-domain data missing the numbering order of the subcarriers in the merged frequency-domain received data.

5. The frequency-domain data merging method according to claim 4, further comprising:
merging time-domain received data of each frequency band that has been subjected to up-conversion, so as to determine merged time-domain received data, comprising:
obtaining the merged time-domain received data by performing inverse Fourier transform on the merged frequency-domain received data.

6. The frequency-domain data merging method according to claim 5, further comprising:
measuring a signal Time Of Arrival (TOA) according to the merged frequency-domain received data, comprising:
obtaining merged frequency-domain channel data by dividing data of each frequency band in the merged frequency-domain received data by corresponding frequency band data in locally transmitted frequency-domain data;
wherein the locally transmitted frequency-domain data is configured to indicate locally merged original bandwidth frequency-domain transmission data, and is obtained in the following manner: sorting the transmitted data of each frequency band according to a size order of the subcarriers, and performing zero padding on the missing frequency band to merge the sorted data of each frequency band, so as to obtain the locally transmitted frequency-domain data; and the merged frequency-domain channel data is configured to indicate merged bandwidth frequency-domain channel impulse response data, and is obtained in the following manner: obtaining the merged frequency-domain channel data by dividing frequency band data of each frequency band in the received merged frequency-domain received data by corresponding frequency data of each frequency band in the locally transmitted frequency-domain data; and measuring a signal TOA corresponding to the merged frequency-domain channel data by using a multiple signal classification method.

7. The frequency-domain data merging method according to claim 5, further comprising:

measuring a signal Time of arrival (TOA) according to the merged time-domain received data, comprising:

performing a mathematical correlation operation on the merged time-domain received data and the locally transmitted time-domain data, and using a detected earliest arrival signal corresponding to the merged time-domain received data as the signal TOA, wherein the locally transmitted time-domain data is obtained by performing inverse Fourier transform on the locally transmitted frequency-domain data to a time domain.

8. The frequency-domain data merging method according to claim 6, further comprising:

measuring a signal TOA according to the merged time-domain received data, comprising:

detecting merged time-domain channel data, and using a detected earliest arrival signal as the signal TOA;

wherein the merged time-domain channel data is configured to indicate merged bandwidth time-domain channel impulse response data, and is obtained in the following manner: obtaining the merged time-domain channel data by performing inverse Fourier transform on the merged frequency-domain channel data.

9. A frequency-domain data merging apparatus, comprising:

an obtaining module, configured to respectively perform up-conversion on baseband data of a plurality of frequency bands in a frequency domain, so as to obtain frequency-domain received data of each frequency band from among the plurality of frequency bands that has been subjected to up-conversion; and a merging module, configured to merge the frequency-domain received data of each frequency band that has been subjected to up-conversion, so as to obtain merged frequency-domain received data.

10. A non-transitory computer-readable storage medium, in which a computer program is stored, wherein the computer program is configured to, when executed by a processor, perform the method according to claim 1.

11. An electronic apparatus comprising a memory and a processor, wherein a computer program is stored in the memory, and the processor is configured to:

respectively perform up-conversion on baseband data of a plurality of frequency bands in a frequency domain, so as to obtain frequency-domain received data of each frequency band from among the plurality of frequency bands that has been subjected to up-conversion; and merge the frequency-domain received data of each frequency band that has been subjected to up-conversion, so as to obtain merged frequency-domain received data, wherein the processor is further configured to:

respectively determine a frequency difference between a center frequency of each frequency band from among the plurality of frequency bands and an overall center frequency, wherein the overall center frequency is a frequency determined according to a center frequency of a first frequency band, a center frequency of a second frequency band, a bandwidth of the first frequency band, and a bandwidth of the second frequency band, the first frequency band is a frequency band with the maximum center frequency from among the plurality of frequency bands, and the second frequency band is a frequency band with the minimum center frequency from among the plurality of frequency bands; and perform up-conversion on baseband data of each frequency band in the frequency domain according to the frequency difference between the center frequency of each frequency band and the overall center frequency, so as to obtain the frequency-domain received data of each frequency band from among the frequency bands that has been subjected to up-conversion, wherein a subcarrier frequency of the frequency-domain received data of each frequency band from among the plurality of frequency bands is configured to indicate the sum of a subcarrier frequency of the baseband data of each frequency band from among the plurality of frequency bands and the frequency difference.

12. The electronic apparatus according to claim 11, wherein the processor is further configured to:

acquire pre-configured frequency band information; and perform down-conversion on the frequency band data of each frequency band from among the plurality of frequency bands to a baseband according to the frequency band information, so as to obtain baseband data of each frequency band from among the plurality of frequency bands.

13. The electronic apparatus according to claim 12, wherein the frequency band information comprises: a frequency band center frequency, a frequency band bandwidth, and time-frequency resource information for transmitting a positioning signal.

14. The electronic apparatus according to claim 11, wherein the processor is further configured to:

sort the frequency-domain received data of each frequency band that has been subjected to up-conversion according to a numbering order of subcarriers of each frequency band, and merge the sorted frequency-domain received data of each frequency band that has been subjected to up-conversion into the merged frequency-domain received data;

wherein in a process of merging the sorted frequency-domain received data of each frequency band that has been subjected to up-conversion into the merged frequency-domain received data, zero padding is performed on the frequency-domain data missing the numbering order of the subcarriers in the merged frequency-domain received data.

15. The electronic apparatus according to claim 14, wherein the processor is further configured to:

merge time-domain received data of each frequency band that has been subjected to up-conversion, so as to determine merged time-domain received data, comprising:

obtain the merged time-domain received data by performing inverse Fourier transform on the merged frequency-domain received data.

16. The electronic apparatus according to claim 15, wherein the processor is further configured to:

obtain merged frequency-domain channel data by dividing data of each frequency band in the merged frequency-domain received data by corresponding frequency band data in locally transmitted frequency-domain data;

wherein the locally transmitted frequency-domain data is configured to indicate locally merged original bandwidth frequency-domain transmission data, and is obtained in the following manner: sorting the transmitted data of each frequency band according to a size order of the subcarriers, and performing zero padding on the missing frequency band to merge the sorted data of each frequency band, so as to obtain the locally transmitted frequency-domain data; and the merged frequency-domain channel data is configured to indicate merged bandwidth frequency-domain channel impulse response data, and is obtained in the following manner:

obtaining the merged frequency-domain channel data by dividing frequency band data of each frequency band in the received merged frequency-domain received data by corresponding frequency data of each frequency band in the locally transmitted frequency-domain data; and measure a signal TOA corresponding to the merged frequency-domain channel data by using a multiple signal classification method.

17. The electronic apparatus according to claim 15, wherein the processor is further configured to:

perform a mathematical correlation operation on the merged time-domain received data and the locally transmitted time-domain data, and use a detected earliest arrival signal corresponding to the merged time-domain received data as the signal TOA, wherein the locally transmitted time-domain data is obtained by performing inverse Fourier transform on the locally transmitted frequency-domain data to a time domain.

18. The electronic apparatus according to claim 16, wherein the processor is further configured to:

detect merged time-domain channel data, and using a detected earliest arrival signal as the signal TOA;

wherein the merged time-domain channel data is configured to indicate merged bandwidth time-domain channel impulse response data, and is obtained in the following manner: obtaining the merged time-domain channel data by performing inverse Fourier transform on the merged frequency-domain channel data.

* * * * *